United States Patent [19]

Brown

[11] 3,846,930
[45] Nov. 12, 1974

[54] APPLICATOR FOR APPLYING A LUBRICANT AND DE-ICER TO A FISHING LINE

[76] Inventor: Dorian W. Brown, 3262 Stephens Ave., Ogden, Utah 84401

[22] Filed: June 28, 1973

[21] Appl. No.: 374,621

[52] U.S. Cl. .................................................. 43/25
[51] Int. Cl. ............................................ A01k 97/16
[58] Field of Search .................................. 43/25, 24

[56] References Cited
UNITED STATES PATENTS

| | | | |
|---|---|---|---|
| 1,473,437 | 11/1923 | Lindstrom | 43/24 |
| 1,627,514 | 5/1927 | Kraemer | 43/25 |
| 2,301,243 | 11/1942 | Binkley | 43/25 |
| 2,583,660 | 1/1952 | Moore | 43/25 |
| 2,715,291 | 8/1955 | Sweigert | 43/25 |
| 3,545,119 | 12/1970 | Murnan | 43/25 |

FOREIGN PATENTS OR APPLICATIONS

| | | | |
|---|---|---|---|
| 10,745 | 0/1899 | Great Britain | 43/25 |
| 257,263 | 9/1967 | Austria | 43/25 |

*Primary Examiner*—Robert Peshock
*Assistant Examiner*—Daniel J. Leach

[57] ABSTRACT

A device serving as a means for applying a lubricant and a de-icer fluid to a fishing line consisting primarily of a sleeve having a self-contained reservoir for fluid. The fluid is applied automatically to the fishing line when the line passes through the orifice of the sleeve and engages a fluid saturated felt liner. The device is mounted to the fishing rod by a base member which receives a removable bushing.

5 Claims, 4 Drawing Figures

PATENTED NOV 12 1974　　　　　　　　　　　　　　　3,846,930

APPLICATOR FOR APPLYING A LUBRICANT AND DE-ICER TO A FISHING LINE

This invention relates to fishing tackle and more particularly to an applicator device for applying a fluid to the fishing line of a fishing reel.

It is therefore the principal object of this invention to provide an applicator device which will automatically apply a lubricant and de-icer to the fishing line of a reel mounted on a fishing pole.

Another object of this invention is to provide a device of the type described which will have a base member with a sleeve portion which will receive the rod ahead of the reel attached to the fishing rod.

Still another object of this invention is to provide a device of the type described which will have a sleeve which will be hollow so as to form reservoir means for retaining a lubricant and de-icer fluid, the hollow sleeve automatically lubricating the line as it passes through the sleeve, the orifice of the sleeve having a fixed felt liner which absorbs the fluid which is dispensed from the hollow sleeve.

Yet another object of this invention is to provide a device of the type described which will have a plurality of openings on the interior of the sleeve forming a reservoir, the openings enabling the fluid to be absorbed within the felt liner on the interior of the sleeve, the felt serving to wipe the fluid onto the line as the line passes through the sleeve.

A further object of this invention is to provide a device of the type described which will wipe water from the line as the line is played back onto the reel of the fishing pole.

A still further object of this invention is to provide a device of the type described which will have various sized rubber bushings which will be interchangeable within the base portion of the device so as to adapt the device to rods of various diameters.

Other objects of the invention are to provide an applicator device which is simple in design, inexpensive to manufacture, rugged in construction, easy to use and efficient in operation.

These and other objects will be readily evident upon a study of the following specification and the accompanying drawing wherein.

Figure 1:
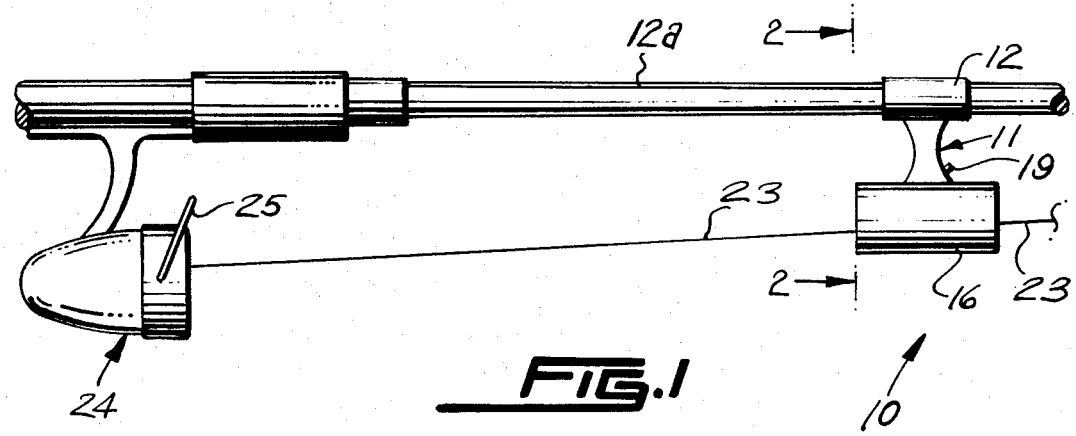
FIG. 1 is a fragmentary side view of a fishing rod showing the invention secured thereon.
Figures 2, 3:
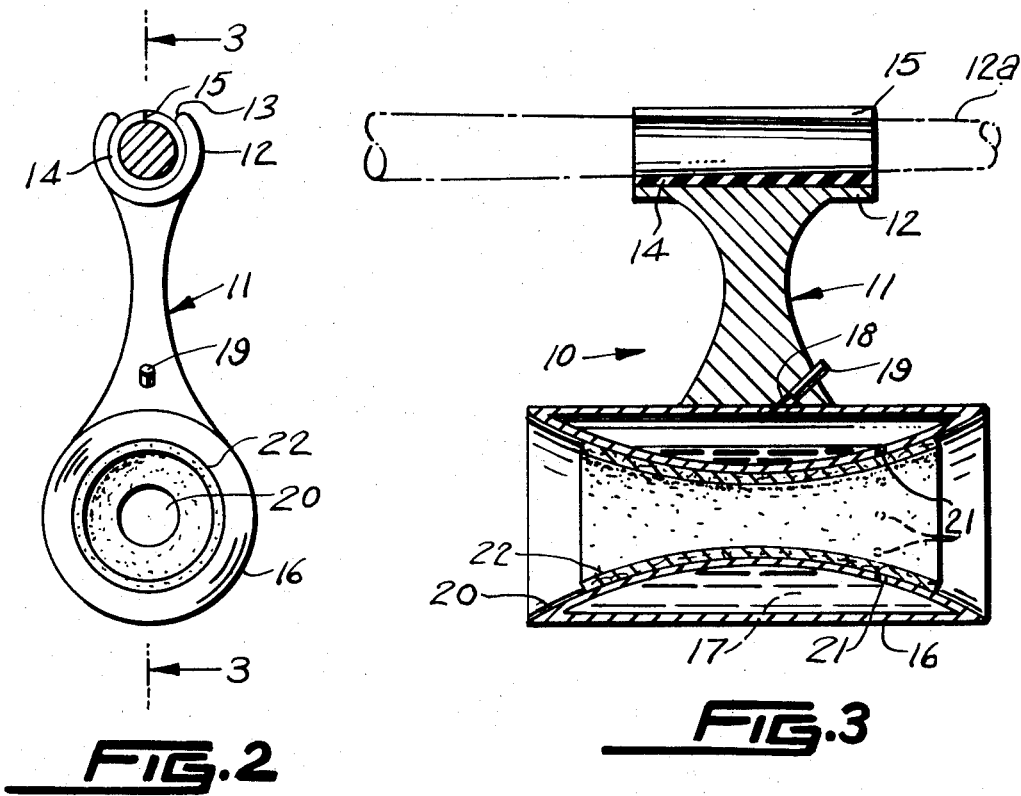
FIG. 2 is an enlarged cross-sectional view taken along the line 2—2 of FIG. 1.
FIG. 3 is a further enlarged cross-sectional view taken along the line 3—3 of FIG. 2 showing the reservoir area with the plug portion shown partly broken away.

According to this invention, an applicator 10 is shown to include a mounting base 11 having an open sleeve 12 for attaching device 10 to fishing rod 12a. The sleeve 12 is fitted onto rod 12a by means of the opening 13. A rubber bushing 14 is tapered in configuration and has an opening 15 extending the length of the pushing 14, so as to enable the bushing 14 to be opened and applied to the fishing pole 12a.

The opposite side of base 11 of device 10 is provided with a hollow double walled sleeve 16 in which is carried a lubricant and de-icer fluid 17. An offset opening 18 through base 11 and sleeve 16, receives a removable plug 19 which serves to seal sleeve 16 until a quantity of fluid 17 is to be replaced within sleeve 16. Within the orifice 20 of sleeve 16 are a plurality of spaced apart openings 21 through which the fluid 17 passes out of so as to saturate the felt lining 22 which is fixedly adhered within the orifice 20.

It shall be noted that the openings 21 of orifice 20 are located in the forward portion of sleeve 16, so as to prevent the escape of fluid 17 when the pole 12a is in a near up-right position.

When the line 23 is payed off of reel 24, it picks up lubricant and de-icer fluid from the felt liner 22 and when line 23 is wound again onto reel 24, the liner 22 serves to wipe water off of the line 23.

Figure 4:
FIG. 4 is an end view showing a second adaptor sleeve for use with a different size fishing rod, the sleeve being shown in elevation.

Referring now to FIG. 4, a bushing 14a is shown which is of a different diameter than bushing 14 so as to adapt device 10 to a fishing rod 12a of a different cross-sectional diameter.

It shall be noted further that device 10 serves to decrease the amount of water on a fishing line 23 when it is drawn back through the guides of the fishing rod 12a and the fluid 17 serves to lubricate the fishing rod guides so as to enable the line 23 to slide easily through the guides for better casting, the device also serving to prevent wear upon the guides, the reel 24 and bail 25.

The lubricant and de-icer fluid 17 of device 10 serves to prevent the water from freezing to the guide and on the reel 24 spool when fishing in freezing temperatures.

The device 10 also serves to preserve monofilament lines and will decrease the amount of curling and kinking of the line 23 when it is removed from the reel 24.

The present invention 10 when in use also serves as a counter balance to offset the weight of the reel 24 and thus makes spin casting less tiresome.

What I now claim is:

1. An applicator for applying a lubricant and de-icer fluid to fishing lines, comprising a mounting base having a sleeve including a rubber bushing mounted therein for frictionally securing said device to a fishing rod, a hollow double walled sleeve mounted on said base and providing reservoir storage means for said lubricant and de-icer fluid and plug means mounted on said base and said sleeve for enabling said hollow sleeve to be refilled with said fluid, a felt liner mounted within said hollow sleeve and providing a means for absorbing said fluid and applying said fluid to the fishing line, said sleeve having means to permit flow of said liquid to said liner.

2. The combination according to claim 1, wherein said sleeve of said base provides mounting means for said device to a fishing rod, is provided with an opening the entire length of said sleeve so as to enable said base to be received upon said fishing rod and said sleeve releaseably receives said rubber bushing, said bushing being tapered and having an opening extending from one end to the other so as to enable said bushing to spread so that it will engage the outer peripheral surface of said fishing rod, said bushing and sleeve receiving said bushing being frictionally urged towards the larger tapered portion of said rod so as to frictionally secure said device to said rod.

3. The combination according to claim 2, wherein the opposite end of said base is secured to said hollow reservoir sleeve in a stationary manner and has an offset opening extending from said base into said reservoir sleeve, said opening receiving a plug which enables said reservoir to be refilled, said sleeve forming said reservoir of said device, said reservoir having a small diameter in the center of the orifice extending through said reservoir sleeve, said orifice having secured thereto a similar configurated felt lining, said lining providing absorbing means for the fluid which is dispensed through said flow means which comprises a plurality of openings near one end of said sleeve on its interior, said orifice providing guide means for said fishing line so as to lubricate said line as it is played off of the reel, said fluid serving to lubricate the guides of the fishing rod simultaneously by said line being in contact with said guides.

4. The combination according to claim 3, wherein said openings within said orifice of said hollow sleeve are radially and equally spaced apart so as to dispense said fluid automatically into said felt liner, said liner being in engagement with said line as it passes through said sleeve and said liner is adhered to the peripheral surface of said orifice of said reservoir sleeve.

5. The combination according to claim 4, wherein said felt liner, when said line is played back upon said reel of said rod, serves to wipe water away from said line by means of the central portion of said felt liner which is smaller in diameter than the end openings of said liner and said device includes adapter bushing means for adapting said device to fishing rods of different cross-sectional diameter.

* * * * *